US011281538B2

(12) United States Patent
Dailey et al.

(10) Patent No.: US 11,281,538 B2
(45) Date of Patent: Mar. 22, 2022

(54) SYSTEMS AND METHODS FOR CHECKPOINTING IN A FAULT TOLERANT SYSTEM (71) Applicant: Stratus Technologies Bermuda, Ltd., Hamilton (BM)

(72) Inventors: Nathaniel Horwitch Dailey, Stow, MA (US); Stephen J. Wark, Shrewsbury, MA (US); Angel L. Pagan, Holden, MA (US)

(73) Assignee: STRATUS TECHNOLOGIES IRELAND LTD., Dublin (IE)

( * ) Notice: Subject to any disclaimer, the term of this patent is extended or adjusted under 35 U.S.C. 154(b) by 0 days.

(21) Appl. No.: 16/900,912

(22) Filed: Jun. 13, 2020

(65) Prior Publication Data
US 2021/0034464 A1 Feb. 4, 2021

Related U.S. Application Data (60) Provisional application No. 62/881,325, filed on Jul. 31, 2019.

(51) Int. Cl.
G06F 11/14 (2006.01)
(52) U.S. Cl.
CPC ...... *G06F 11/1407* (2013.01); *G06F 11/1451* (2013.01); *G06F 11/1458* (2013.01)
(58) Field of Classification Search
CPC ............. G06F 11/1407; G06F 11/1451; G06F 11/1458
See application file for complete search history.

(56) References Cited

U.S. PATENT DOCUMENTS

| | | |
|---|---|---|
| 6,355,991 B1 | 3/2002 | Goff et al. |
| 6,633,996 B1 | 10/2003 | Suffin et al. |
| 6,687,851 B1 | 2/2004 | Somers et al. |
| 6,691,225 B1 | 2/2004 | Suffin |
| 6,691,257 B1 | 2/2004 | Suffin |
| 6,708,283 B1 | 3/2004 | Nevin et al. |

(Continued)

OTHER PUBLICATIONS

Dong et al., "COLO: COarse-grain LOck-stepping Virtual Machine for Non-stop Service", SoCC'13, Oct. 1-3, 2013, Santa Clara, California, USA, ACM 978-1-4503-2428-1; 16 pages.

(Continued)

*Primary Examiner* — Joseph R Kudirka
(74) *Attorney, Agent, or Firm* — K&L Gates LLP (57) ABSTRACT A method and system of checkpointing in a computing system having a primary node and a secondary node is disclosed. In one embodiment the method includes the steps of determining by the primary node to initiate a checkpoint process; sending a notification to the secondary node, by the primary node, of an impending checkpoint process; blocking, by the primary node, I/O requests from the Operating System (OS) that arrive at the primary node after the determination to initiate the checkpoint process; completing, by the primary node, active I/O requests for data received from the OS prior to the determination to initiate the checkpoint process, by accessing the primary node data storage; and upon receiving, by the primary node, a notice of checkpoint readiness from the secondary node, initiating a checkpoint process to move state and data from the primary node to the secondary node.

28 Claims, 5 Drawing Sheets

(56) References Cited

U.S. PATENT DOCUMENTS

| | | |
|---|---|---|
| 6,718,474 B1 | 4/2004 | Somers et al. |
| 6,766,413 B2 | 7/2004 | Newman |
| 6,766,479 B2 | 7/2004 | Edwards |
| 6,802,022 B1 | 10/2004 | Olson |
| 6,813,721 B1 | 11/2004 | Tetreault et al. |
| 6,842,823 B1 | 1/2005 | Olson |
| 6,862,689 B2 | 3/2005 | Bergsten et al. |
| 6,874,102 B2 | 3/2005 | Doody et al. |
| 6,886,171 B2 | 4/2005 | MacLeod |
| 6,928,583 B2 | 8/2005 | Griffin et al. |
| 6,970,892 B2 | 11/2005 | Green et al. |
| 6,971,043 B2 | 11/2005 | McLoughlin et al. |
| 6,996,750 B2 | 2/2006 | Tetreault |
| 7,065,672 B2 | 6/2006 | Long et al. |
| 7,496,786 B2 | 2/2009 | Graham et al. |
| 7,496,787 B2 | 2/2009 | Edwards et al. |
| 7,669,073 B2 | 2/2010 | Graham et al. |
| 7,904,906 B2 | 3/2011 | Puthukattukaran et al. |
| 7,958,076 B2 | 6/2011 | Bergsten et al. |
| 7,984,254 B2 * | 7/2011 | Karamanolis ....... G06F 11/1458 711/162 |
| 8,024,292 B2 * | 9/2011 | Thompson .......... G06F 11/1466 707/640 |
| 8,117,495 B2 | 2/2012 | Graham |
| 8,161,311 B2 | 4/2012 | Wiebe |
| 8,234,521 B2 | 7/2012 | Graham et al. |
| 8,271,416 B2 | 9/2012 | Al-Biek et al. |
| 8,307,154 B2 * | 11/2012 | Stabrawa ............ G06F 12/0866 711/113 |
| 8,312,318 B2 | 11/2012 | Graham et al. |
| 8,381,012 B2 | 2/2013 | Wiebe |
| 8,407,435 B2 * | 3/2013 | Fienblit ............... G06F 11/1466 711/162 |
| 8,682,852 B1 * | 3/2014 | Salamon ............. G06F 11/1471 707/640 |
| 8,812,907 B1 | 8/2014 | Bissett et al. |
| 9,251,002 B2 | 2/2016 | Manchek et al. |
| 9,588,844 B2 | 3/2017 | Bissett et al. |
| 9,652,338 B2 | 5/2017 | Bissett et al. |
| 9,760,442 B2 | 9/2017 | Bissett et al. |
| 10,216,598 B2 | 2/2019 | Haid et al. |
| 10,360,117 B2 | 7/2019 | Haid et al. |
| 2001/0042202 A1 | 11/2001 | Horrath et al. |
| 2002/0016935 A1 | 2/2002 | Bergsten et al. |
| 2002/0070717 A1 | 6/2002 | Pellegrino |
| 2003/0046670 A1 | 3/2003 | Marlow |
| 2003/0095366 A1 | 5/2003 | Pellegrino |
| 2006/0222125 A1 | 10/2006 | Edwards et al. |
| 2006/0222126 A1 | 10/2006 | Edwards et al. |
| 2006/0259815 A1 | 11/2006 | Graham et al. |
| 2006/0274508 A1 | 12/2006 | LaRiviere et al. |
| 2007/0011499 A1 | 1/2007 | Begsten et al. |
| 2007/0028144 A1 | 2/2007 | Graham et al. |
| 2007/0038891 A1 | 2/2007 | Graham |
| 2007/0106873 A1 | 5/2007 | Lally et al. |
| 2007/0174484 A1 | 7/2007 | Lussier et al. |
| 2009/0249129 A1 | 10/2009 | Femia |
| 2015/0205688 A1 | 7/2015 | Haid et al. |
| 2015/0263983 A1 | 9/2015 | Brennan et al. |
| 2017/0324609 A1 | 11/2017 | Hong et al. |
| 2018/0046480 A1 | 2/2018 | Dong et al. |
| 2018/0143885 A1 | 5/2018 | Dong et al. |
| 2018/0314607 A1 * | 11/2018 | Deshpande ............ G06F 16/28 |
| 2020/0050523 A1 | 2/2020 | Pawlowski et al. |
| 2021/0034447 A1 | 2/2021 | Horvath et al. |
| 2021/0034464 A1 | 2/2021 | Dailey et al. |
| 2021/0034465 A1 | 2/2021 | Haid et al. |
| 2021/0034483 A1 | 2/2021 | Haid |
| 2021/0034523 A1 | 2/2021 | Dailey |
| 2021/0037092 A1 | 2/2021 | Cao |

OTHER PUBLICATIONS

Dong et al., "COLO: COarse-grain LOck-stepping Virtual Machine for Non-stop Service", https://www.linux-kvm.org/images/1/1d/Kvm-forum-2013-COLO.pdf; 24 pages.

* cited by examiner

SYSTEMS AND METHODS FOR CHECKPOINTING IN A FAULT TOLERANT SYSTEM

RELATED APPLICATIONS

This application claims the benefit of priority to U.S. Provisional Application No. 62/881,325, filed Jul. 31, 2019, and which is incorporated herein by reference in its entirety.

FIELD

The disclosure relates generally to the field of fault tolerant computing and more specifically to checkpointing in a fault tolerant server.

BACKGROUND

There are a variety of ways to achieve fault tolerant computing in a server system. As an example, it is possible to connect two (or more) computers, such that one computer, the primary computer (also referred to as machine or node) actively makes calculations or obtains data requested by a client while the secondary computer makes the same calculations as the primary computer to shadow the results of the primary computer. This form of fault tolerant computing, termed active-active fault tolerance, is performed in case the primary computer, or hardware or software component thereon, experiences some type of failure. In these systems, the information about the current state of the primary computer must be periodically saved to the secondary computer so that the primary and secondary computers are substantially synchronized and the secondary computer can substantially take over computation at the point in the calculations where the active primary computer experienced a failure.

The periodic transfer of data to maintain synchrony between the states of the primary and secondary computers is termed checkpointing. A checkpoint defines a point in time when the data is to be transferred from the primary to the secondary computer. A checkpoint controller, which is typically a software module, determines when a checkpoint is declared to occur. During a checkpoint, the processing on the primary computer is at some point paused, so that the final state of the primary machine and associated memory is not changed during the checkpoint interval and once the relevant data is transferred, both the primary and secondary computers are in the same state. When the transfer of information between the primary and secondary computers is complete, the checkpoint is complete, and the execution by the primary and secondary computers is resumed and continues to run the application until the next checkpoint, when the process repeats.

Checkpoints can be determined by the checkpoint controller either to occur by the passage of a fixed amount of elapsed time from the last checkpoint, or by the occurrence of some event, such as: the number pages of memory accessed (termed dirty pages); the occurrence of a network event (such as network acknowledgement output from the primary computer); or the occurrence of excessive buffering on the secondary computer (as compared to available memory) during the execution of the application. Elapsed time checkpointing is considered fixed checkpointing, while event based checkpointing is considered dynamic or variable-rate checkpointing.

In summary the process of checkpointing generally involves copying the operational state (both memory and processor state) of the primary system to the secondary system In this way, the two systems operate in a fault tolerant manner, with the secondary system available if the primary system fails or experiences a significant error. This must be done while minimizing the amount of time the primary and secondary computers are paused while the data is moved from the primary to secondary computer.

Some of the challenges of checkpointing include how to manage a server system when initiating a checkpoint. When starting a checkpoint, the server system can be in various states. For example, typically, a read from an operating system can be outstanding prior to a checkpoint operation. If the response is received by the primary system while a checkpoint operation is in process, the response must be saved and supplied to both the primary and secondary system after the checkpoint is completed. Each of these states must be taken into account as a checkpoint is initiated and processed.

The present disclosure addresses these challenges and others.

SUMMARY

In one aspect, the disclosure relates to a method of checkpointing in a computing system having a primary node and a secondary node, wherein each of the primary node and the secondary node includes a respective cache memory, a respective active memory and a respective storage system. In one embodiment the method includes the steps of determining, by the primary node, to initiate a checkpoint; sending, by the primary node, a notification to the secondary node of an impending checkpoint process; blocking, by the storage driver in the primary node, I/O requests from the operating system (OS) on the primary node after the determination to execute the checkpoint; completing, by the primary node, active I/O requests for data received from the OS of the primary node prior to the determination to execute the checkpoint, by accessing the primary node data storage; and upon receiving, by the primary node, a notice of checkpoint readiness from the secondary node, initiating the checkpoint process to transfer data from the primary node to the secondary node.

In another embodiment the method includes receiving, at the secondary node, the notification of checkpoint determination. In yet another embodiment the method includes blocking, by the secondary node, new I/O requests from the OS, which arrive at the secondary node after receipt, by the secondary node, of notification of the determination to execute the checkpoint. In still another embodiment the method includes completing active I/O requests for data by accessing data storage at the secondary node. In still yet another embodiment the method includes initializing a checkpoint process on the secondary node.

In another embodiment, the step of discarding cache memory on the secondary node is completed after the checkpoint process is complete. In yet another embodiment, both the primary node and the secondary node apply data from the checkpoint to each respective storage system in the background after the checkpoint process is complete. In still yet another embodiment, the method includes a request, from the OS, to write data to the primary node and the secondary node and the method writes data to the respective cache memory of the primary node and the secondary node.

In another embodiment, in response to a request by the OS for data from the primary node and the secondary node the method reads data from the respective cache memory of the primary node and the secondary node if the data requested resides in the respective cache memory of the primary node and the secondary node. In yet another embodiment, the method includes reading from the respective storage system of the primary node and the secondary node if the data requested does not reside in the respective cache memory of the primary node and the secondary node. In yet another embodiment, the primary node and the secondary node designate one portion of the cache memory for data modified during execution since the last checkpoint process, and another portion for data modified prior to the last checkpoint process. In one embodiment, the primary node and the secondary node designate one portion of the cache memory for data modified during the current run interval, and another portion for data modified during previous run intervals. In one embodiment, a run interval includes a period between checkpoints or a subset or superset thereof.

In another aspect, the disclosure relates to a system for checkpointing. In one embodiment, the system includes a computing system comprising a primary node and a secondary node, wherein each of the primary node and the secondary node includes a respective cache memory and a respective storage system. In this embodiment, the system includes computer-executable logic, encoded in memory of the primary and secondary nodes, for executing checkpointing in the system, wherein the computer-executable program logic is configured for the execution of determining by the primary node to initiate a checkpoint process; sending, by the primary node, a notification to the secondary node of an impending checkpoint process; blocking, by the storage driver in the primary node, I/O requests received from the OS that arrive at the primary node after the determination to initiate the checkpoint process; completing, by the primary node, active I/O requests for data from the OS received prior to the determination to initiate the checkpoint process, by accessing the primary node data storage; and upon receiving, by the primary node, a notice of checkpoint readiness from the secondary node, initiating a checkpoint process transferring data from the primary node to the secondary node. In another embodiment, the computer-executable program logic is further configured for the execution of receiving, at the secondary node, the notification of an impending checkpoint process. In yet another embodiment, the program logic includes blocking, by the secondary node, new I/O requests from the OS that arrive at the secondary node after receipt, by the secondary node, of notification of the determination to initiate the checkpoint process. In still another embodiment, the system includes completing active I/O requests for data at the secondary node. In still yet a further embodiment, the system includes initializing checkpoint process on the secondary node.

In another embodiment, the step of discarding cache memory on the secondary node is completed when its memory is overwritten during the checkpoint process. In one embodiment, secondary cache is discarded when its memory is overwritten by the memory from the primary. In yet another embodiment, both the primary node and the secondary node apply data from the checkpoint to each respective storage system in the background after the checkpoint process is complete. In still another embodiment, a request from the OS to write data to the primary node and the secondary node writes data to the respective cache memory of the primary node and the secondary node.

In yet a further embodiment, a request by the OS for data from the primary node and the secondary node reads data from the respective cache memory of the primary node and the secondary node if the data requested resides in the respective cache memory of the primary node and the secondary node; and reads from the respective storage system of the primary node and the secondary node if the data requested does not reside in the respective cache memory of the primary node and the secondary node. In another embodiment, during the checkpoint, data from the cache memory of the primary node is written to the cache memory of the secondary node. In yet another embodiment, one portion of the cache memory is reserved for data modified during execution since the last checkpoint process, and another portion is reserved for data modified prior to the last checkpoint process.

In a third aspect, the disclosure relates to a computer program product for checkpointing in a computing system having a primary node, a secondary node, wherein each of the primary node and the secondary node includes a respective cache memory and a respective storage system. In an embodiment, the computer program product includes a non-transitory computer readable medium encoded with computer executable program for initiating a checkpointing process in the computing system, the code configured to enable the execution of determining by the primary node when to initiate a checkpoint process. In yet another embodiment, the computer program product includes code for sending a notification to the secondary node, by the primary node, of the impending checkpoint process. In yet another embodiment, the computer program product includes code for blocking, by the storage driver in the primary node, I/O requests from the operating system (OS) that arrive at the primary node after the determination to initiate the checkpoint process. In yet a further embodiment, the computer program product includes code for completing, by the primary node, active I/O requests from the OS prior to the determination to initiate the checkpoint process, for data, by accessing the primary node data storage. In still yet another embodiment, the computer program product upon receiving, by the primary node, a notice of checkpoint readiness from the secondary node, includes code for executing a checkpoint process from the primary node to the secondary node.

In another embodiment, the computer program product includes code that is further configured to enable the execution of receiving, at the secondary node, the notification of checkpoint determination. In yet another embodiment, the computer program product includes code for blocking, by the secondary node, new I/O requests from the OS that arrive at the secondary node after receipt, by the secondary node, of notification of the determination to initiate the checkpoint process. In still another embodiment, the computer program product includes code for completing active I/O requests for data stored at the secondary node. In still yet another further embodiment, the computer program product includes code for initializing checkpoint process on the secondary node.

In a further embodiment, the computer program product includes code that discards cache memory from the secondary node after the checkpointing process is complete. In yet another embodiment, the computer program product includes code for applying data from the checkpoint to storage in the primary node and the secondary node after the checkpoint process is complete.

In another embodiment, the computer program product includes code wherein a request from the OS to write data to the primary node and the secondary node writes data to the respective cache memory of the primary node and the secondary node. In yet another embodiment, the computer program product includes code wherein a request by the OS for data from the primary node and the secondary node reads data from the respective cache memory of the primary node and the secondary node if the data requested resides in the respective cache memory of the primary node and the secondary node; and reads from the respective storage system of the primary node and the secondary node if the data requested does not reside in the respective cache memory of the primary node and the secondary node.

In another embodiment, the computer program product includes code wherein during the checkpoint; data from the cache memory of the primary node is written to the cache memory of the secondary node. In yet another embodiment, the computer program product includes code for designating one portion of the cache memory for data modified during execution since the last checkpoint process, and another portion for data modified prior to the last checkpoint process. All of the embodiments disclosed herein provide to fault tolerant systems generally including those implemented as active-active fault tolerant systems.

BRIEF DESCRIPTION OF THE DRAWINGS

The structure and function of the embodiments of the disclosure can be best understood from the description herein in conjunction with the accompanying figures. The figures are not necessarily to scale, emphasis instead generally being placed upon illustrative principles. The figures are to be considered illustrative in all aspects and are not intended to limit the disclosure, the scope of which is defined only by the claims.

DESCRIPTION OF A PREFERRED EMBODIMENT

The disclosure relates to fault tolerant systems such as active-active fault tolerant systems. An active-active fault tolerant system includes two or more nodes that actively run the same application or service on each node of the system. In one embodiment, in an active-active fault tolerant system protected guests or operating system instances run independently. Accordingly, a given node may include an OS. These systems can be implemented using one or more types of checkpointing. Checkpointing may be used to save and copy the state of a primary computer to one or more secondary computers. Generally, managing checkpointing in a fault tolerant system can be complicated by outstanding I/Os on any of the systems within the fault tolerant system. Improving the efficiency of checkpointing is beneficial to the fault tolerant computer industry. The disclosure addresses this challenge and other technical problems associated with fault tolerant computing and checkpointing implementations.

In various embodiments, the current disclosure describes a fault tolerant computer system that supports and facilitates fault tolerance using an active-active node configuration. In various embodiments, an active-active node configuration includes connecting two or more nodes in a fault tolerant group. The nodes within a fault tolerant group checkpoint data from a primary node to one or more other nodes within the fault tolerant group, such as a secondary node. The current disclosure provides a significant reduction in complexity associated with ensuring proper storage redundancy and operation when using an active-active checkpointing system.

In various embodiments, a node includes an instance of an operating system (OS), as well as hardware including a processor, cache memory, active memory, data storage and interfaces. The cache memory, active memory and data storage may include solid state memory such as non-volatile memory express (NVMe) devices and memory storage. In various embodiments, cache is a portion of the active data memory available to a node. In various embodiments, one portion of the cache memory is used for data modified during execution since the last checkpoint process, and another portion for data modified prior to the last checkpoint process. In various embodiments, the OS instance includes a checkpoint engine, a filter driver, a storage driver, and a network hardware driver. The checkpoint engine manages checkpoint processes and communication between the primary node and the secondary node. The filter driver and the storage driver is the interface between the operating system and any storage in each respective node, such as the cache and data storage. The network hardware driver is the interface to the network hardware interface, which is how each node accesses external networks. In one embodiment, one or more caches are part of the filter driver. In one embodiment, data storage such as disks, NVME or other low latency storage is not updated during the checkpoint, but when the cache is flushed following a checkpoint.

In various embodiments, in active-active checkpointing, two OS instances, one on each node, run independently. Alternatively, two active guests, such as protected guests, or active virtual machines may run independently in other embodiments. When the execution by the OS instances diverges beyond a certain point, the fault tolerant system may determine that the OS instances (or active guests) require synchronization and a checkpoint process should be executed. A given checkpoint process or operation facilitates the OS instances (or active guests) being synchronized. During a checkpoint operation, the memory of the secondary node is overwritten by the checkpoint data and each respective node updates data storage from the checkpoint data. In some embodiments, the checkpoint data is stored in cache.

In some embodiments, nodes within a fault tolerant group may periodically initiate a checkpoint process from a primary node to a secondary node. For example, in one embodiment, when a determination is made to initiate a checkpoint process, each node in the active-active checkpointing system enters a checkpoint pending state where all new I/Os from the operating system are blocked. During the checkpoint pending state, each node in the fault tolerance group waits until all outstanding storage accesses are complete. Upon completion of any outstanding storage accesses, the primary node commences with the checkpoint process from the primary node to the secondary node.

In various embodiments, during a checkpoint pending state, a primary node notifies the secondary node of an impending checkpoint process. In response to the impending checkpoint notification, both the primary node and the secondary nodes halt all incoming data I/Os, from the operating system, from being processed by data storage. In one embodiment, the operating system is blocked from accessing storage or cache while the I/O pause is active. In one embodiment, the nodes allow all currently active data I/Os to complete being processed by data storage. When the primary node completes processing the data I/Os, the primary node waits for a notification of completion of all active data I/Os from the secondary node. When the secondary node completes all active data I/Os, the secondary node notifies the primary node that the secondary node has completed all active I/Os.

Upon receipt of the completion of all active data I/Os notification at the primary node, the primary node enters a checkpointing state and initiates the checkpoint process with the secondary node. During a checkpointing process, data from cache memory is transferred from the primary node to secondary node. The primary node state, including processor state, is also transferred as part of this process. Once the checkpoint process is complete, the secondary node notifies the primary node of completion and/or validation of the checkpoint process and the flow of incoming data I/Os from the operating system is restarted and processing by each node resumes. In some embodiments, when processing by each node resumes; each respective node applies the checkpoint data to storage in the background.

Figure 1:
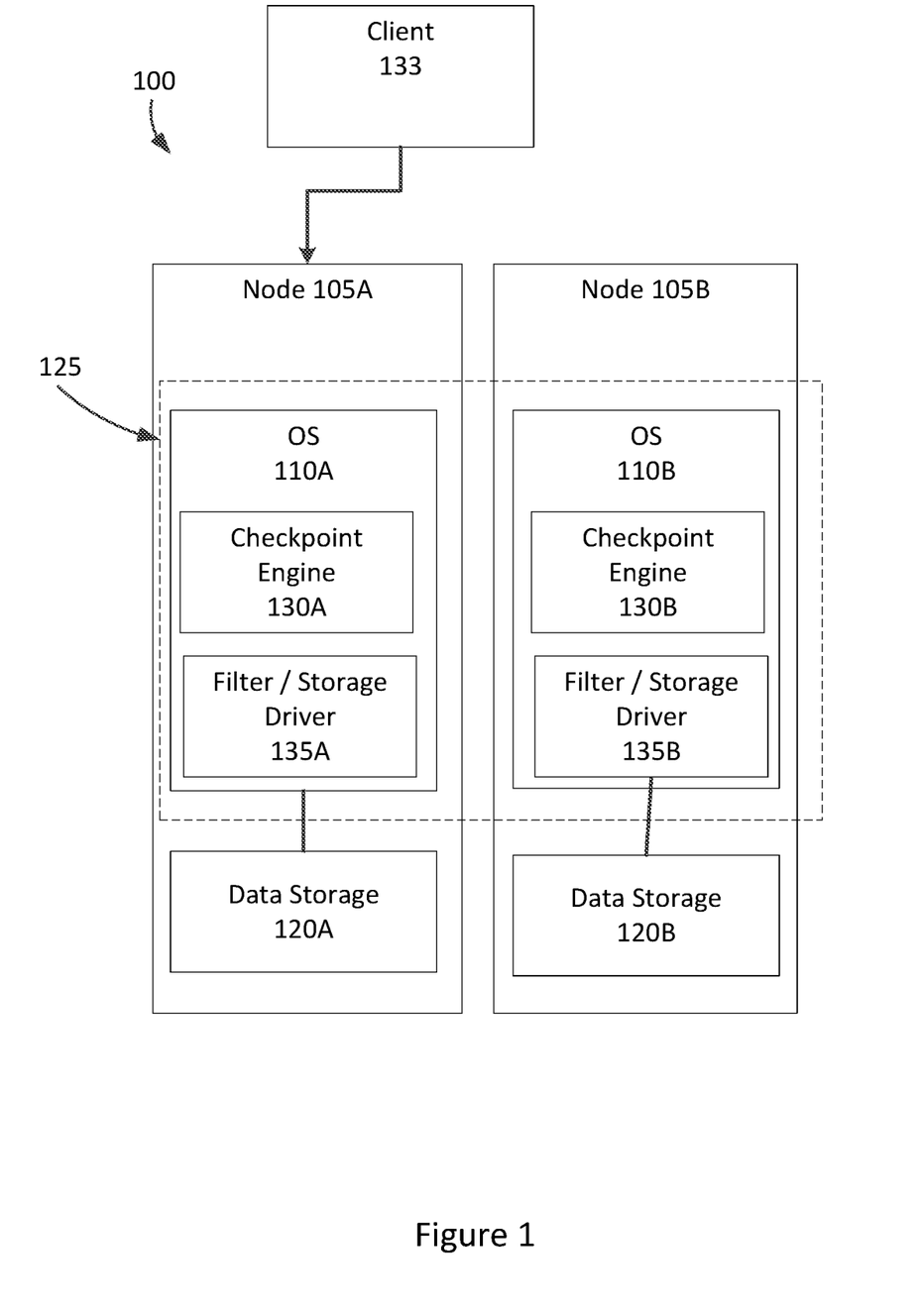
FIG. 1 is a schematic diagram of an embodiment of an active-active fault tolerant system configured to execute checkpoints between a primary node to a secondary node according to the disclosure.

FIG. 1 is a simplified illustration of an embodiment of an active-active fault tolerant system that includes instructions and components to initiate checkpoints and perform one or more check pointing related steps disclosed herein between a primary node and a secondary node. As shown, the active-active data storage system 100 includes primary node 105A and secondary node 105B. Primary node 105A includes OS instance 110A, and data storage 120A (active memory is not shown). Secondary node 105B includes OS instance 110B, and data storage 120B. OS instance 110A and 110B each includes checkpoint engines 130A and 130B and Filter/Storage driver 135A and 135B respectively. Each filter/storage driver 135A and 135B contains or otherwise includes a write cache. In this embodiment, each write-cache is configured to be a write-cache with read-thru and OS 110A and OS 110B are in group 125. Group 125 indicates that OS instance 110A and OS 110B are grouped to provide fault tolerance functionality to client 133 using the active-active fault tolerant system 100.

In various embodiments, data storage and/or cache within the data storage system 100 may utilize non-volatile memory express (NVMe) devices to store data within each respective cache and each respective portion of data storage. In various embodiments, both cache and data storage are provided from the same low latency solid state storage such as an NVMe storage device. In some embodiments, cache is provided from a separate disk of data storage. In some embodiments, cache is provided from operating memory. In other embodiments, data storage and/or cache within the data storage system 100 utilize various types and/or various combinations of fast memory technology such as solid state and other chip-based or motherboard resident memory. In some embodiments, cache is memory from within or otherwise associated with or in communication with the filter driver. In some embodiments, the filter driver manages cache external to the storage driver. In various embodiments, a write-cache with read-thru enables a computer system to write data I/Os to the cache. In various embodiments, the computer system accesses any data from the underlying disk data storage if the data is not accessible on the cache.

In some embodiments, NVMe storage may provide reduced latency (i.e., < about 10 microseconds) thereby significantly minimizing the impact of allowing active data I/Os to complete. In contrast, typically, data storage and computing systems using pre-NVMe type storage have significantly longer I/O latency of about 5-15 milliseconds. The difference in time, 10 microseconds vs 10 milliseconds, means that a data storage and/or computing system using NVMe storage can complete one thousand I/O operations in the same time a pre-NVMe system can complete a single I/O operation, causing each I/O to data storage to have a negligible effect on the system. Allowing active I/Os to complete in a data storage or computing system using NVMe storage will take significantly less time than managing I/Os while processing checkpoint data.

In general, solid state memory storage devices having a latency of less than about 100 microseconds are suitable for using for data storage embodiments as disclosed herein. In one embodiment, solid state memory storage devices having a latency of less than about 70 microseconds are suitable for using for data storage embodiments as disclosed herein. In one embodiment, solid state memory storage devices having a latency that ranges from about 1 microsecond to about 70 microseconds are suitable for using for data storage embodiments as disclosed herein. In one embodiment, the systems disclosed herein can be implemented using NVMe over Fabrics (NVMe-oF) systems.

Figure 2:
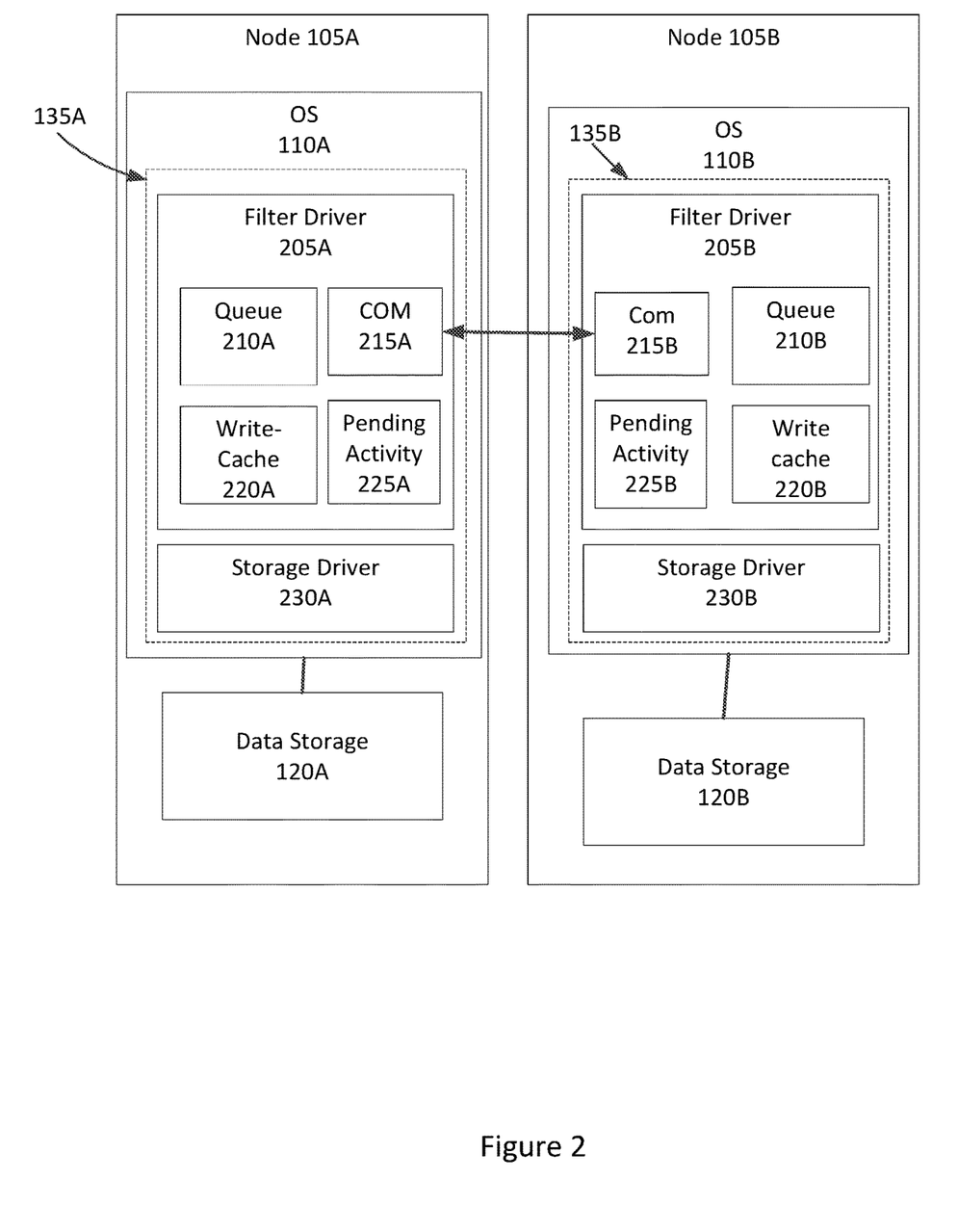
FIG. 2 is a more detailed schematic diagram of the embodiment shown in FIG. 1 showing an active-active fault tolerant system configured to execute checkpoints between a primary node and a secondary node according to the disclosure.

FIG. 2 is more detailed illustration of the embodiment shown in FIG. 1. FIG. 2 shows the filter driver and storage driver of an active-active fault tolerant system, in accordance with an embodiment of the present disclosure. Filter/storage driver 135A includes filter driver 205A and storage driver 230A. Filter/storage driver 135B includes filter driver 205B and storage driver 230B. Filter driver 205A includes queue 210A, communications module 215A, write cache 220A, and pending activity module 225A. Filter driver 205B includes queue 210B, communications module 215B, write cache 220B, and pending activity module 225B. In this embodiment, queue 210A and queue 210B are configured to store data I/Os incoming from OS 110A and OS 110B respectively.

Communications module 215A and communications module 215B enable filter driver 205A and filter driver 205B to communicate with each other. Pending activity module 225A and pending activity module 225B keep track of active data I/O accesses from OS 110A and OS 110B respectively. In some embodiments, the pending activity module 225A keeps a counter of how many data I/O accesses are currently active. Filter driver 205A and filter driver 205B utilize storage driver 230A and storage driver 230B, respectively, to communicate with data storage 120A, 120B. In some embodiments, when a filter driver is tasked with stopping all incoming I/Os from its respective OS, the filter driver will store incoming I/Os in the queue until the checkpoint process has been completed.

Figure 3:
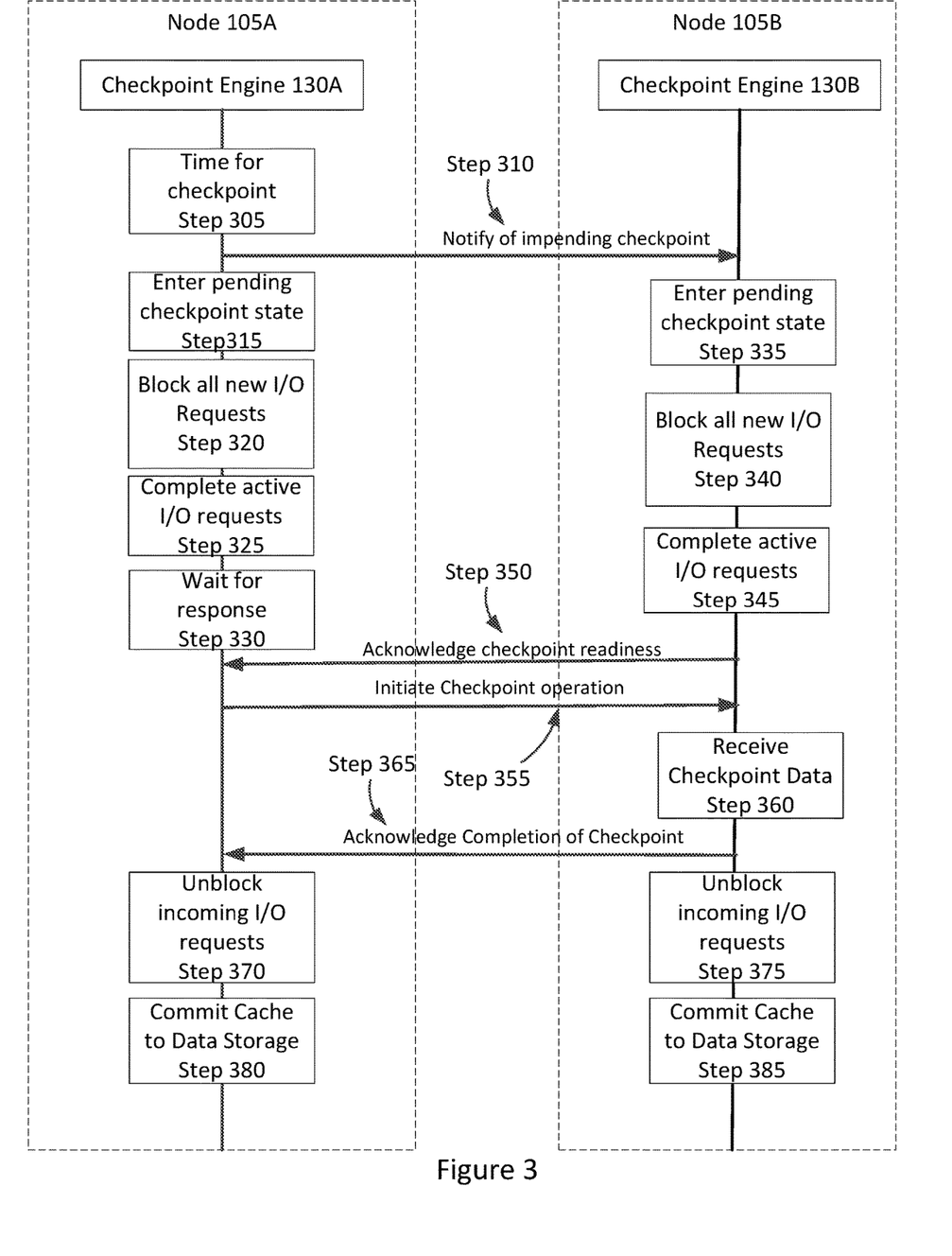
FIG. 3 is a simplified diagram of an embodiment of instructions and data flow of a fault tolerant system checkpointing from a primary node to a secondary node according to the disclosure.

FIG. 3 is a simplified diagram of an embodiment of the instruction and data flow of a data storage system checkpointing from a primary node to a secondary node. The diagram includes interactions between nodes, in accordance with an embodiment of the present disclosure. The diagram shows interactions between the nodes as well as internal steps. As you move down the figure from top to bottom you are progressing forward in time.

As shown in FIG. 3, in this exemplary embodiment, primary node 105A is grouped with secondary node 105B to provide an active-active fault tolerant system 100. Primary node 105A includes a checkpoint engine 130A within the OS instance 110A (FIG. 1) which communicates with secondary node 105B to schedule and/or coordinate processing of a checkpoint. Similarly, secondary node 105B includes checkpoint engine 130B to schedule and/or coordinate processing of the checkpoint from primary node 105A. As shown, the checkpoint engine 130A on the primary node 105A determines that a checkpoint needs to be processed (Step 305).

In some embodiments, a checkpoint is needed 1) when cache has been filled beyond a specified level, 2) when the primary node 105A and secondary node 105B are out of sync, or 3) upon initialization of the primary node 105B. The checkpoint engine 130A sends a message to secondary node 105B notifying secondary node 105B that there is an impending checkpoint (Step 310). The checkpoint engine 130A then places primary node 105A in a pending checkpoint state (Step 315). During a pending checkpoint state, the checkpoint engine 130A directs the filter driver 205A (FIG. 2) to block all new I/O requests the filter driver 205A (FIG. 2) receives from the OS 110A (Step 320) after the checkpoint is declared and the filter driver 205A (FIG. 2) allows all active I/O requests received by primary node 105A before the checkpoint was declared to complete (Step 325). Primary node 105A then waits for a response and/or acknowledgment from secondary node 105B (Step 350) indicating secondary node 105B is ready for the checkpoint process as described below.

At secondary node 105B, upon receiving notification of an impending checkpoint, secondary node 105B also enters a checkpoint pending state (Step 335). During the checkpoint pending state, the filter driver 205B (FIG. 2) also blocks all new I/O requests from the OS 110B (Step 340) and completes any active data I/O requests received by the filter driver 205B (FIG. 2) from the OS 110B prior to entering the checkpoint pending state (Step 345). Upon completion of all active requests, secondary node 105B sends a message (Step 350) to the checkpoint engine 130A of primary node 105A acknowledging that secondary node 105B is ready for a checkpoint operation.

Upon receipt of checkpoint readiness at primary node 105A, the checkpoint engine 130A initiates a checkpoint operation with secondary node 105B (Step 355). Upon initiation of a checkpoint, primary node 105A transfers checkpoint data to secondary node 105B. Specifically, data from write-cache 220A is sent to secondary node 105B to be stored in cache 220B (Step 360). Once the checkpoint process is complete, secondary node 105B sends a message to the checkpoint engine 130A at primary node 105A acknowledging the completion of the checkpoint process (Step 365). At this point, both primary node 105A and secondary node 105B unblock incoming I/O requests (Step 370 and Step 375) allowing each of the nodes 105A and 105B to continue execution from the same state, which is the current state of primary node 105A, the primary node. In the background, both nodes 105A and 105B apply the checkpoint data to data storage 120A (FIG. 2) and data storage 120B (FIG. 2) respectively from caches 220A and 220B (Step 380 and Step 385).

Figure 4:
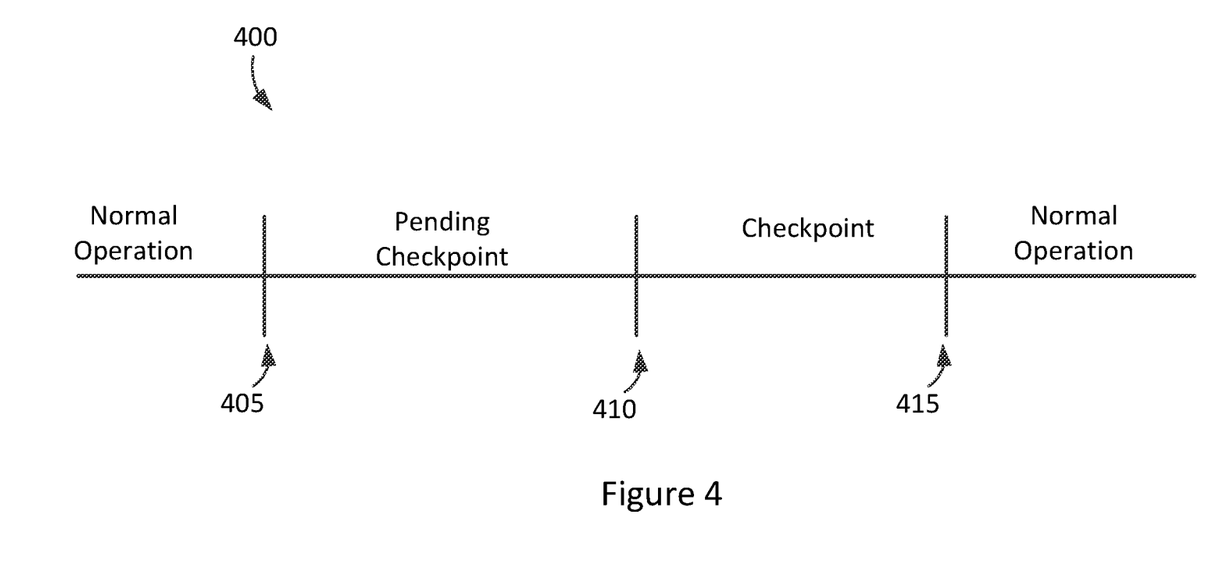
FIG. 4 is an embodiment of a timeline of how each node within an active-active fault tolerant system handles a checkpoint.

FIG. 4 is an embodiment of a timeline of how each node within an active-active data storage system handles a checkpoint, in accordance with an embodiment of the present disclosure. Timeline 400 shows the operation of a node within an active-active data storage system grouped into a fault tolerance group while attempting to checkpoint from a primary node to a secondary node. During the timeline 400, the active-active fault tolerant system goes through three different transitions which are shown by arrows 405, 410, and 415. At the transition point shown by arrow 405, a primary node has determined that a checkpoint needs to take place to synchronize state and memory data from the primary node to the secondary node. The primary node notifies the secondary node of the impending checkpoint activity. Both the primary node and the secondary node transition to a pending checkpoint state. During the pending checkpoint state, each node blocks any new incoming I/O requests from the OS and allows any active I/O requests to complete. Upon completion of all active I/O requests, shown by arrow 410, the primary node executes a checkpoint process with the secondary node. Once the checkpoint process is complete, the secondary node notifies the primary node of completion and/or validation of the checkpoint and both the primary node and the secondary node transition into normal operation, which is shown by arrow 415.

Figure 5:
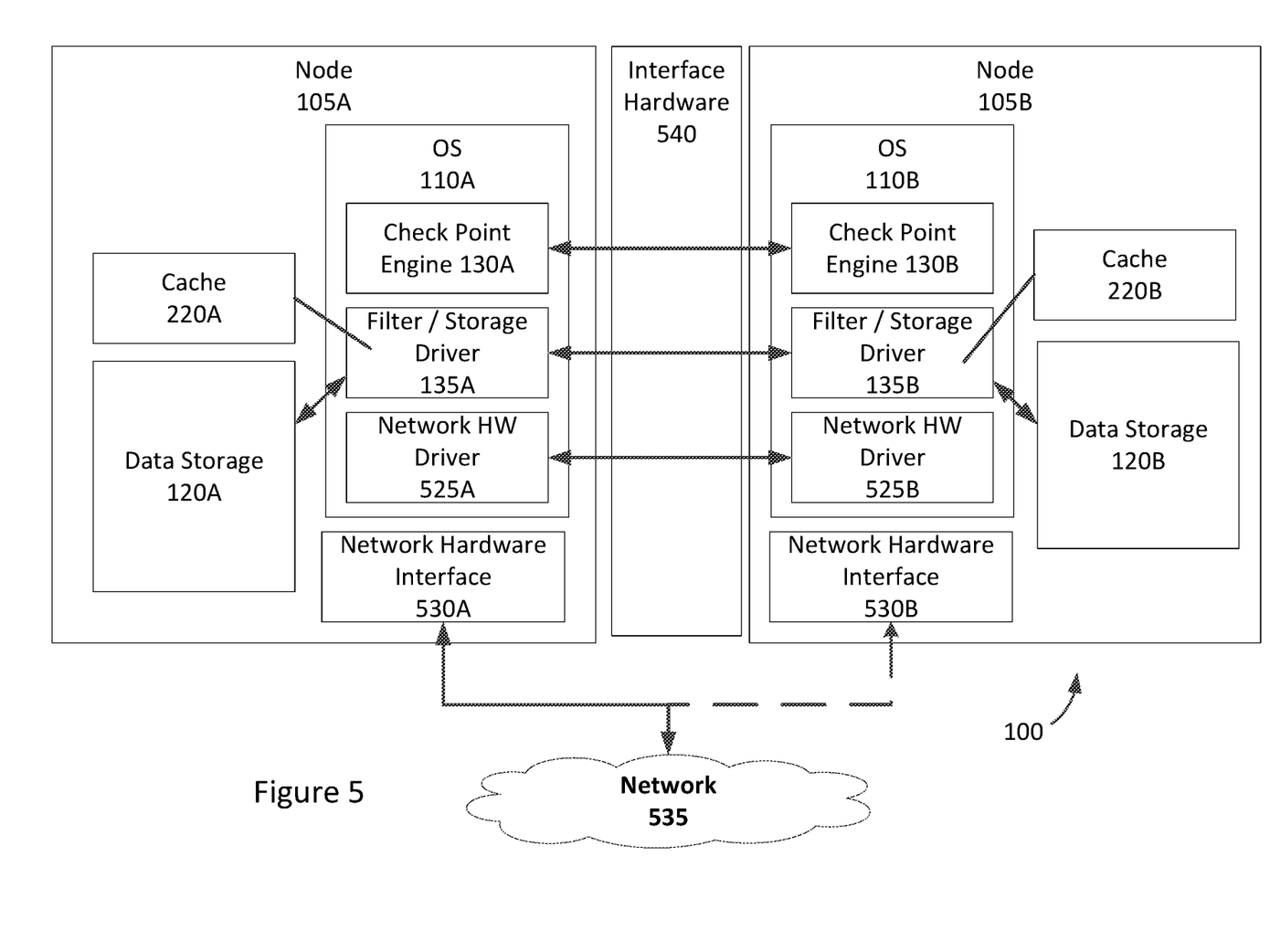
FIG. 5 is a more detailed depiction of an embodiment of the components and operation thereof of FIG. 1.

FIG. 5 is a more detailed depiction of an embodiment of the components and operation of the embodiment of FIG. 1. In FIG. 5, the active-active fault tolerant system 100 provides fault tolerant processing. As shown, the active-active fault tolerant system 100 includes primary node 105A, secondary node 105B, and interface hardware 540. Active-Active fault tolerant system 100 is connected to the external network 535 with the dotted line indicating an optional path when the secondary node is promoted to primary node.

Primary node 105A includes OS 110A, write-cache 220A, data storage 120A, and network hardware interface 530A. OS 110A includes checkpoint engine 130A, filter/storage driver 135A, and network hardware driver 525A. Secondary node 105B includes OS 110B, write-cache 220B, data storage 120B, and network hardware interface 530B. OS 110B includes checkpoint engine 130B, filter/storage driver 135B, and network hardware driver 525B. In this embodiment, primary node 105A and secondary node 105B communicate through interface hardware 540 and communicate with the client and other external systems using external network 535. OS 110A communicates with write-cache 220A and data storage 120A using filter/storage 135A. OS 110B communicates with write-cache 220B and data storage 120B using filter/storage driver 135B. OS 110A and OS 110B are linked, similar to as shown in FIG. 1, into a group to provide fault tolerance.

In this embodiment, primary node 105A is the primary node and secondary node 105B is the secondary node in the active-active fault tolerant system 100. Checkpoint engine 130A, within OS 110A, periodically checks the status of primary node 105A and node 105B to determine if a checkpoint is needed. Once checkpoint engine 130A determines that a checkpoint is needed, checkpoint engine 130A notifies checkpoint engine 130B of the impending checkpoint and enters a checkpoint pending state. Once in a checkpoint pending state, checkpoint engine 130A directs the filter/storage driver 135A to stop all new incoming I/O requests from the OS 110A from being processed and allows active I/Os to complete. Once all active I/Os on primary node 105A are complete, checkpoint engine 130A waits for an acknowledgement from secondary node 105B that all active I/Os on secondary node 105B are complete.

Upon receiving a notification of an impending checkpoint at checkpoint engine 130B, checkpoint engine 130B places secondary node 105B in a checkpoint pending state and directs the filter/storage driver 135B to stop all incoming I/O requests from the OS 110B to complete. Checkpoint engine 130B is enabled to prepare write-cache 220B and data storage 120B for the impending checkpoint process. Once all active I/Os complete on secondary node 105B, checkpoint engine 130B notifies checkpoint engine 130A that secondary node 105B is ready for checkpointing activity.

Upon receipt of a message indicating readiness of secondary node 105B, checkpoint engine 130A collects relevant information including data from write-cache 220A, using filter/storage driver 135A, and processor state of primary node 105A. Checkpoint engine 130A then initiates a checkpoint to checkpoint engine 130B on secondary node 105B. Upon initiation of a checkpoint process, checkpoint engine 130B processes received information from checkpoint engine 130A. Secondary node 105B uses the received information to update write-cache 220B, and the state of the processor of secondary node 105B to mirror the state of the primary node 105A. When the checkpoint on secondary node 105B is completed, checkpoint engine 130B notifies checkpoint engine 130A of the completion of the checkpoint. At this point, both primary node 105A and secondary node 105B transition into a normal mode and continue processing any received I/Os from the same state. Subsequently, both filter/storage driver 135A and filter/storage driver 135B flush checkpoint data, in the background, from write-cache 220A and write-cache 220B to Data storage 120A and data storage 120B respectively. In one embodiment, data storage (disk or other storage) is not updated when the cache is flushed following a checkpoint.

In various embodiments, configurations of active-active data storage system as described herein are enhanced by using solid state memory or specialized memory interfaces. In one embodiment, solid state memory is used that interfaces with motherboard directly or via a specialized bus such as the Peripheral Component Interconnect Express (PCIe) bus. In one embodiment, the memory storage is solid state memory such as SSD or NVMe storage devices are used. Solid state storage is used in lieu of traditional rotating media such as hard drives with rotating platters. In these embodiments, Active-Active data storage systems accelerate the checkpoint process while also simplifying management of data I/Os while attempting to complete each checkpoint process. Instead of concurrently managing each incoming I/O while processing a checkpoint process, the active-active data storage system benefits from the speed of the NVMe storage, which takes less time to finish processing active I/Os than it does to manage incoming I/Os.

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding or "deferring" or "pausing" or "applying" or "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the present disclosure is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the present disclosure. The examples are intended primarily for purposes of illustration of the disclosure for those skilled in the art. No particular aspect or aspects of the examples are necessarily intended to limit the scope of the present disclosure.

The figures and descriptions of the present disclosure have been simplified to illustrate elements that are relevant for a clear understanding of the present disclosure, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C #, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The disclosure may be embodied in other specific forms without departing from the spirit or essential characteristics thereof. The foregoing embodiments are therefore to be considered in all respects illustrative rather than limiting on the disclosure described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

What is claimed is:

1. A method of checkpointing in a computing system having a primary node and a secondary node wherein each of the primary node and the secondary node includes an operating system (OS), a respective cache memory and a respective storage system wherein each storage system includes a storage driver, the method comprising the steps of:

determining, by the primary node, when to initiate a checkpoint process;

sending a notification to the secondary node, by the primary node, of an impending checkpoint process;

blocking, by the storage driver in the primary node, I/O requests from the OS on the primary node after the determination to initiate the checkpoint process;

completing, by the primary node, active I/O requests for data, received from the OS of the primary node prior to the determination to initiate the checkpoint process, by accessing the primary node data storage system; and upon receiving, by the primary node, a notice of checkpoint readiness from the secondary node, initiating the checkpoint process from the primary node to the secondary node.

2. The method of claim 1, further comprising:
receiving, at the secondary node, the notification of the impending checkpoint process;
blocking, by the secondary node, new I/O requests from the OS of the secondary node that arrive at the secondary node after receipt, by the secondary node, of a notification of the determination to initiate the checkpoint process;
completing active I/O requests for data at the secondary node; and
initializing a checkpoint process on the secondary node.

3. The method of claim 1, wherein the checkpoint process comprises the steps of:
determining what data from the primary node to include in checkpoint data; and
copying the checkpoint data from the primary node to the secondary node.

4. The method of claim 3, wherein data in the cache memory of the secondary node is overwritten when the checkpoint process is complete.

5. The method of claim 3, wherein both the primary node and the secondary node apply data from the checkpoint to each respective storage system in the background after the checkpoint process is complete.

6. The method of claim 1 wherein a request from a client to write data to the primary node writes data to the respective cache memory of the primary node and wherein the primary node sends the request to the secondary node which writes the data to the respective cache memory of the secondary node.

7. The method of claim 1 wherein a read request by the respective OS of the primary node and the secondary node for data from the primary node and the secondary node reads data from the respective cache memory of the primary node and the secondary node if data requested resides in the respective cache memory of the primary node and the secondary node, and reads from the respective storage system of the primary node and the secondary node if data requested does not reside in the respective cache memory of the primary node and the secondary node.

8. The method of claim 1, wherein during the checkpoint process, data from the cache memory of the primary node is written to the cache memory of the secondary node.

9. The method of claim 8, wherein one portion of the cache memory of the primary and secondary node is reserved for data modified during execution since a previous checkpoint process, and wherein a second portion of the cache memory of the primary and secondary node is reserved for data modified prior to the previous checkpoint process.

10. A computing system comprising:
a primary node and a secondary node wherein each of the primary node and the secondary node includes an operating system (OS), a respective cache memory and a respective storage system wherein each storage system includes a storage driver; and
computer-executable logic, encoded in memory of the computing system, for executing checkpointing in the computing system, wherein the computer-executable program logic is configured for the execution of:
determining, by the primary node, when to initiate a checkpoint process;
sending a notification to the secondary node, by the primary node, of an impending checkpoint process;
blocking, by the storage driver in the primary node, I/O requests received from the OS on the primary node after the determination to initiate the checkpoint process;
completing, by the primary node, active I/O requests for data, received from the OS of the primary node prior to the determination to initiate the checkpoint process, by accessing the primary node data storage system; and
upon receiving, by the primary node, a notice of checkpoint readiness from the secondary node, initiating the checkpoint process from the primary node to the secondary node.

11. The system of claim 10, wherein the computer-executable program logic is further configured for the execution of:
receiving, at the secondary node, the notification of the impending checkpoint process;
blocking, by the secondary node, new I/O requests from the OS of the secondary node, that arrive at the secondary node after receipt, by the secondary node, of a notification of the determination to initiate the checkpoint process;
completing active I/O requests for data at the secondary node; and
initializing a checkpoint process on the secondary node.

12. The system of claim 10, wherein the checkpoint process comprises the steps of:
determining what data from the primary node to include in checkpoint data; and
copying the checkpoint data from the primary node to the secondary node.

13. The system of claim 12, wherein data in the cache memory of the secondary node is overwritten when the checkpoint process is complete.

14. The system of claim 12, wherein both the primary node and the secondary node apply data from the checkpoint to each respective storage system in the background after the checkpoint process is complete.

15. The system of claim 10, wherein a request from a client to write data to the primary node writes data to the respective cache memory of the primary node and wherein the primary node sends the request to the secondary node which writes the data to the respective cache memory of the secondary node.

16. The system of claim 10, wherein a read request by the respective OS of the primary node and the secondary node for data from the primary node and the secondary node reads data from the respective cache memory of the primary node and the secondary node if data requested resides in the respective cache memory of the primary node and the secondary node, and reads from the respective storage system of the primary node and the secondary node if data requested does not reside in the respective cache memory of the primary node and the secondary node.

17. The system of claim 10, wherein during the checkpointing process, data from the cache memory of the primary node is written to the cache memory of the secondary node.

18. The system of claim 17, wherein one portion of the cache memory of the primary and secondary node is reserved for data modified during execution since a previous checkpoint process, and wherein a second portion of the cache memory of the primary and secondary node is reserved for data modified prior to the previous checkpoint process.

19. The system of claim 10 wherein the respective storage system comprises a non-volatile memory express (NVMe) data storage device or a bus.

20. A computer program product for checkpointing in a computing system having a primary node and a secondary node wherein each of the primary node and the secondary node includes an operating system (OS), a respective cache memory and a respective storage system wherein each storage system includes a storage driver, the computer program product comprising:
a non-transitory computer readable medium encoded with computer executable program code for executing checkpointing in the computing system, the code configured to enable the execution of:
determining, by the primary node, when to initiate a checkpoint process;
sending a notification to the secondary node, by the primary node, of an impending checkpoint process;
blocking, by the storage driver in the primary node, I/O requests received from the OS on the primary node after the determination to initiate the checkpoint process;
completing, by the primary node, active I/O requests from the OS of the primary node prior to the determination to initiate the checkpoint process, by accessing the primary node data storage system; and
upon receiving, by the primary node, a notice of checkpoint readiness from the secondary node, initiating the checkpoint process from the primary node to the secondary node.

21. The computer program product of claim 20, wherein the code is further configured to enable the execution of:
receiving, at the secondary node, the notification of the impending checkpoint process;
blocking, by the secondary node, new I/O requests from the OS of the secondary node, that arrive at the secondary node after receipt, by the secondary node, of a notification of the determination to initiate the checkpoint process;
completing active I/O requests for data on the secondary node; and
initializing a checkpoint process on the secondary node.

22. The computer program product of claim 20, wherein the checkpoint process comprises the steps of:
determining what data from the primary node to include in checkpoint data; and copying the checkpoint data from the primary node to the secondary node.

23. The computer program product of claim 22, wherein data in the cache memory of the secondary node is overwritten when the checkpoint process is complete.

24. The computer program product of claim 22, wherein both the primary node and the secondary node apply data from the checkpoint to each respective storage system in the background after the checkpoint process is complete.

25. The computer program product of claim 20, wherein a request from a client to write data to the primary node writes data to the respective cache memory of the primary node and wherein the primary node sends the request to the secondary node which writes the data to the respective cache memory of the secondary node.

26. The computer program product of claim 20, wherein a read request by the respective OS of the primary node and the secondary node for data from the primary node and the secondary node reads data from the respective cache memory of the primary node and the secondary node if data requested resides in the respective cache memory of the primary node and the secondary node, and reads from the respective storage system of the primary node and the secondary node if data requested does not reside in the respective cache memory of the primary node and the secondary node.

27. The computer program product of claim 20, wherein during the checkpoint process, data from the cache memory of the primary node is written to the cache memory of the secondary node.

28. The computer program product of claim 27, wherein one portion of the cache memory of the primary and secondary node is reserved for data modified during execution since a previous checkpoint process, and wherein a second portion of the cache memory of the primary and secondary node is reserved for data modified prior to the previous checkpoint process.

* * * * *